United States Patent
Asahara

(10) Patent No.: US 11,656,917 B2
(45) Date of Patent: May 23, 2023

(54) DISTRIBUTED PROCESSING MANAGEMENT APPARATUS, DISTRIBUTED PROCESSING METHOD, AND COMPUTER-READABLE RECORDING MEDIUM

(71) Applicant: NEC CORPORATION, Tokyo (JP)

(72) Inventor: Masato Asahara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 434 days.

(21) Appl. No.: 16/759,202

(22) PCT Filed: Oct. 25, 2018

(86) PCT No.: PCT/JP2018/039734
§ 371 (c)(1),
(2) Date: Apr. 24, 2020

(87) PCT Pub. No.: WO2019/082982
PCT Pub. Date: May 2, 2019

(65) Prior Publication Data
US 2020/0319936 A1    Oct. 8, 2020

Related U.S. Application Data

(60) Provisional application No. 62/577,408, filed on Oct. 26, 2017.

(51) Int. Cl.
*G06E 1/00* (2006.01)
*G06F 9/50* (2006.01)
(Continued)

(52) U.S. Cl.
CPC .......... *G06F 9/5083* (2013.01); *G06F 9/541* (2013.01); *G06N 20/00* (2019.01)

(58) Field of Classification Search
CPC ..................................................... G06F 9/5083
(Continued)

(56) References Cited

U.S. PATENT DOCUMENTS 5,761,498 A * 6/1998 Ooe ........................ G06F 16/182
10,229,148 B1 * 3/2019 Nguyen ................ G06F 16/955
(Continued)

FOREIGN PATENT DOCUMENTS

JP    09-218858 A    8/1997
JP    2002-358293 A    12/2002
(Continued)

OTHER PUBLICATIONS

Nobuyuki Kuromatsu, et al., "wiz: Platform-Transparent Machine Learning Platform", IPSJ SIG, Jul. 28, 2015, vol. 2015-HPC-150, No. 18, pp. 1-7.
(Continued)

*Primary Examiner* — Evral E Bodden
(74) *Attorney, Agent, or Firm* — Sughrue Mion, PLLC

(57) ABSTRACT

A distributed processing management apparatus 10 is connected to a plurality of execution servers 20 so as to be able to communicate with the execution servers 20. The distributed processing management apparatus 10 is provided with a conversion instruction unit 11 configured to specify, for each execution server 20, a data format usable by a machine learning engine executed by the execution server 20, and issue an instruction to convert a data format of data held by the execution server 20 to the specified data format.

13 Claims, 15 Drawing Sheets

(51) Int. Cl.
*G06N 20/00* (2019.01)
*G06F 9/54* (2006.01)

(58) Field of Classification Search
USPC .......................................................... 706/10
See application file for complete search history.

(56) References Cited

U.S. PATENT DOCUMENTS

| | | | | |
|---|---|---|---|---|
| 10,824,474 | B1* | 11/2020 | Kamboj | ................ G06F 9/5038 |
| 2011/0041006 | A1* | 2/2011 | Fowler | .................... G06F 9/466 |
| | | | | 714/E11.131 |
| 2016/0234342 | A1* | 8/2016 | Oonk | ........................ H04Q 9/00 |
| 2022/0101480 | A1* | 3/2022 | Kalamkar | ............ G06N 3/0445 |

FOREIGN PATENT DOCUMENTS

| | | | | |
|---|---|---|---|---|
| JP | 2012-022558 A | | 2/2012 | |
| JP | 2012022558 A | * | 2/2012 | ........... G06N 99/005 |
| JP | 2017-004509 A | | 1/2017 | |

OTHER PUBLICATIONS

Evan R. Sparks, et al., "Automating Model Search for Large Scale Machine Learning", SoCC '15, Aug. 27-29, 2015, pp. 1-13.
International Search Report for PCT/JP2018/039734 dated Dec. 4, 2018 [PCT/ISA/210].
Written Opinion for PCT/JP2018/039734 dated Dec. 4, 2018 [PCT/ISA/237].
International Preliminary Report on Patentability with translation of Written Opinion dated Apr. 28, 2020 in English International Application No. PCT/JP2018/039734.

* cited by examiner

Fig.4

```
OVERALL PROCESSING
....
val rawInputData = loadData('/path/to/data')
val commonFormattedData = rawInputData.convertToCommonFormat()
val mlParameters = createMLParameters('
{
    [
        {
            MLEngineType: 'LibLinear',
            ParameterA: [...],
            ParameterB: [...]
        },
        {
            MLEngineType: 'Scikit-learn',
            ParameterC: [...],
            ParameterD: [...]
        },
        {
            MLEngineType: 'ScalaNLP',
            ParameterE: [...],
            ParameterF: [...]
        }
    ]
}                            OVERALL PROCESSING
')
val learnedModels = commonData.divideAndDistribute().map(learn(mlParameters))
// learn FUNCTIONS EXECUTED IN PARALLEL ON DISTRIBUTED SERVERS
```

Fig.5

```
CONVERSION TO COMMON FORMAT
----
abstract class Data = {    val data
    def constructor(rawInputData) = {
        header = rawInputData.getDataType()
        switch (header) {
            case 'LibSVM':
                return new LibSVMData(rawInputData)
            case 'Pandas':
                return new PandasData(rawInputData)
        }
    }
    def convertToCommonFormat()
}
class LibSVMData extends Data = {
    def convertToCommonFormat() = {
        commonFormattedData = DenseMatrix(data.xLength, data.yLength)
        foreach (element : data) {
            // LibSVM format is a sparse matrix.
            val x = element.getFirstValue()
            val y = element.getSecondValue()
            val val = element.getThirdValue()
            commonFormattedData.set(x, y, val)    // Put 'val' in (x, y) of the matrix.
        }
        return commonFormattedData
    }
}
class PandasData extends Data = {
    def convertToCommonFormat() = {
        commonFormattedData = DenseMatrix(data.xLength, data.yLength)
        var y = 0
        foreach (row : data) {
            var x = 0
            foreach (column : row) {
                // Pandas format is a table.
```

Fig.6

```
CONVERSION FROM COMMON FORMAT TO DATA FORMAT THAT MACHINE LEARNING ENGINE CAN HANDLE
....
def learn(mlParameter) = {
    // EXECUTION FLOW BRANCHES AT MACHINE LEARNING ENGINE DESIGNATED BY MASTER SERVER
    switch (mlParameter.getMLEngineType()) {
        case 'LibLinear':
            return learnWithLibLinear
        case 'Scikit-learn':
            return learnWithScikitLearn
        case 'ScalaNLP':
            return learnWithScalaNLP
    }
}
def learnWithLibLinear(matrix) = {
    // Convert to LibLinear data type.
    val mlEngineFormattedData = new LibLinearMatrix(matrix.xLength, matrix.yLength)
    var y = 0
    for (row : matrix) {
        var x = 0
        for (column : row) {
            x += 1
            mlengineFormattedData[x, y] = column
        }
        y += 1
    }
    return runLibLinear(mlEngineFormattedData) }
def learnWithScikitLearn(matrix) = {
    // Convert to Numpy data type.
    val mlEngineFormattedData = new NumpyMatrix(matrix.xLength, matrix.yLength)
    var y = 0
    for (row : matrix) {
        var x = 0
        for (column : row) {
            x += 1
```

Fig.8

EXECUTION SERVER A

| SAMPLE ID (STRING TYPE) | FEATURE AMOUNT 1 (BINARY TYPE) | FEATURE AMOUNT 2 (INTEGER TYPE) | FEATURE AMOUNT 3 (FLOATING POINT TYPE) | PREDICTED TARGET VARIABLE (INTEGER TYPE) |
|---|---|---|---|---|
| 1 | 1.8 | 3 | 2.5 | 1 |
| 2 | 3.4 | 1 | -2.9 | -1 |

EXECUTION SERVER B

| SAMPLE ID (STRING TYPE) | FEATURE AMOUNT 1 (BINARY TYPE) | FEATURE AMOUNT 2 (INTEGER TYPE) | FEATURE AMOUNT 3 (FLOATING POINT TYPE) | PREDICTED TARGET VARIABLE (INTEGER TYPE) |
|---|---|---|---|---|
| 3 | 2.3 | 0 | 3.8 | -1 |
| 4 | 0 | -5 | -10.4 | 1 |

Fig.9

COMMON FORMAT

| SAMPLE ID (FLOATING POINT TYPE) | FEATURE AMOUNT 1 (FLOATING POINT TYPE) | FEATURE AMOUNT 2 (FLOATING POINT TYPE) | FEATURE AMOUNT 3 (FLOATING POINT TYPE) | PREDICTED TARGET VARIABLE (FLOATING POINT TYPE) |
|---|---|---|---|---|

Fig.10

EXECUTION SERVER A

| SAMPLE ID (FLOATING POINT TYPE) | FEATURE AMOUNT 1 (FLOATING POINT TYPE) | FEATURE AMOUNT 2 (FLOATING POINT TYPE) | FEATURE AMOUNT 3 (FLOATING POINT TYPE) | PREDICTED TARGET VARIABLE (FLOATING POINT TYPE) |
|---|---|---|---|---|
| 1.0 | 1.8 | 3.0 | 2.5 | 1.0 |
| 2.0 | 3.4 | 1.0 | -2.9 | -1.0 |

EXECUTION SERVER B

| SAMPLE ID (FLOATING POINT TYPE) | FEATURE AMOUNT 1 (FLOATING POINT TYPE) | FEATURE AMOUNT 2 (FLOATING POINT TYPE) | FEATURE AMOUNT 3 (FLOATING POINT TYPE) | PREDICTED TARGET VARIABLE (FLOATING POINT TYPE) |
|---|---|---|---|---|
| 3.0 | 2.3 | 0 | 3.8 | -1.0 |
| 4.0 | 0 | -5.0 | -10.4 | 1.0 |

Fig.11

DATA FORMAT REQUIRED BY MACHINE LEARNING ENGINE A

| ORIGINAL WAS COLUMN OF VALUE OF FEATURE AMOUNT 1 COLUMN (FLOATING POINT TYPE) | ORIGINAL WAS COLUMN OF VALUE OF FEATURE AMOUNT 2 COLUMN (FLOATING POINT TYPE) | ORIGINAL WAS COLUMN OF VALUE OF FEATURE AMOUNT 3 COLUMN (FLOATING POINT TYPE) | ORIGINAL WAS COLUMN OF VALUE OF PREDICTED TARGET VARIABLE COLUMN (FLOATING POINT TYPE) |
|---|---|---|---|

DATA FORMAT REQUIRED BY MACHINE LEARNING ENGINE B

| ORIGINAL WAS COLUMN OF VALUE OF SAMPLE ID COLUMN (FLOATING POINT TYPE) | ORIGINAL WAS COLUMN OF VALUE OF PREDICTED TARGET VARIABLE COLUMN (FLOATING POINT TYPE) | ORIGINAL WAS COLUMN OF VALUE OF FEATURE AMOUNT 1 COLUMN (FLOATING POINT TYPE) | ORIGINAL WAS COLUMN OF VALUE OF FEATURE AMOUNT 2 COLUMN (FLOATING POINT TYPE) | ORIGINAL WAS COLUMN OF VALUE OF FEATURE AMOUNT 3 COLUMN (FLOATING POINT TYPE) |
|---|---|---|---|---|

Fig.12

EXECUTION SERVER A

| (FLOATING POINT TYPE) | (FLOATING POINT TYPE) | (FLOATING POINT TYPE) | (FLOATING POINT TYPE) |
|---|---|---|---|
| 1.8 | 3.0 | 2.5 | 1.0 |
| 3.4 | 1.0 | −2.9 | −1.0 |

EXECUTION SERVER B

| (FLOATING POINT TYPE) | (FLOATING POINT TYPE) | (FLOATING POINT TYPE) | (FLOATING POINT TYPE) | (FLOATING POINT TYPE) |
|---|---|---|---|---|
| 3.0 | −1.0 | 2.3 | 0 | 3.8 |
| 4.0 | 0 | 0 | −5.0 | −10.4 |

Fig.13

DATA FORMAT REQUIRED BY MACHINE LEARNING ENGINE A

| ORIGINAL WAS COLUMN OF VALUE OF SAMPLE ID COLUMN (FLOATING POINT TYPE) | ORIGINAL WAS COLUMN OF VALUE OF FEATURE AMOUNT 1 COLUMN (FLOATING POINT TYPE) | ORIGINAL WAS COLUMN OF VALUE OF FEATURE AMOUNT 2 COLUMN (FLOATING POINT TYPE) | ORIGINAL WAS COLUMN OF VALUE OF FEATURE AMOUNT 3 COLUMN (FLOATING POINT TYPE) | ORIGINAL WAS COLUMN OF VALUE OF PREDICTED TARGET VARIABLE COLUMN (FLOATING POINT TYPE) |
|---|---|---|---|---|

DATA FORMAT REQUIRED BY MACHINE LEARNING ENGINE B

| ((x1, y1), v1) | ((x2, y2), v2) | ((x3, y3), v3) | ... |
|---|---|---|---|

Fig.14

EXECUTION SERVER A

| (FLOATING POINT TYPE) | (FLOATING POINT TYPE) | (FLOATING POINT TYPE) | (FLOATING POINT TYPE) | (FLOATING POINT TYPE) |
|---|---|---|---|---|
| 1.0 | 1.8 | 3.0 | 2.5 | 1.0 |
| 2.0 | 3.4 | 1.0 | -2.9 | -1.0 |

EXECUTION SERVER B

| ((1,1), 3.0) | ((1,2), 2.3) | ((1,4), 3.8) | ((1,5), -1.0) | ((2,1), 4.0) | ((2,3), -5.0) | ((2,4), -10.4) | ((2,5), 1.0) |

DISTRIBUTED PROCESSING MANAGEMENT APPARATUS, DISTRIBUTED PROCESSING METHOD, AND COMPUTER-READABLE RECORDING MEDIUM

CROSS REFERENCE TO RELATED APPLICATIONS

This application is a National Stage of International Application No. PCT/JP2018/039734 filed Oct. 25, 2018, claiming priority based on U.S. Patent Application No. 62/577,408 filed Oct. 26, 2017.

TECHNICAL FIELD

The present invention relates to a distributed processing system that forms a distributed processing platform, a distributed processing management apparatus for managing an execution server in the distributed platform, and a distributed processing method, and further relates to a computer-readable recording medium where a program for realizing these is recorded.

BACKGROUND ART

Conventionally, in the field of machine learning, since it is necessary to efficiently process a large amount of data, a distributed processing platform that distributes data processing to a large number of execution servers and executes the data processing has been used (for example, see Patent Document 1).

For example, Apache Hadoop and Apache Spark are known as examples of distributed processing platforms. Among these, according to Apache Spark, it is possible to reduce latency when processing a job including multiple stages, and furthermore it is possible to realize the use of data between jobs. For this reason, Apache Spark is particularly effective for machine learning in which it is necessary for the same processing to be repeatedly executed many times (for example, see Non-Patent Document 1).

Also, ordinarily, when performing machine learning using a distributed processing platform, a user selects a machine learning library according to their purpose from among various usable machine learning libraries. Then, the user executes the machine learning on the distributed processing platform using the selected machine learning library.

In addition, in recent years, there are many usable machine learning libraries, so it has become difficult to select an appropriate machine learning library. Therefore, Patent Document 2 discloses technology for comparing a plurality of machine learning libraries and presenting a comparison result to the user.

LIST OF RELATED ART DOCUMENTS

Patent Documents

Patent Document 1: Japanese Patent Laid-Open Publication No. 2012-22558

Patent Document 2: Japanese Patent Laid-Open Publication No. 2017-04509

Non-Patent Documents

Non-Patent Document 1: Sparks et al. "Automating Model Search for Large Scale Machine Learning." In ACM SoCC, 2015.

SUMMARY OF INVENTION

Problems to be Solved by the Invention

Incidentally, according to the technology disclosed in Patent Document 2, it is thought that a user can easily select a machine learning library. However, there are situations where the user wishes to execute machine learning using not only one machine learning library, but a plurality of machine learning libraries.

However, in a conventional distributed processing platform, it is not planned to use a plurality of machine learning libraries, and when using a plurality of machine learning libraries, task definition is complicated for a user and the burden on the user increases.

An example object of the invention is to provide a distributed processing management apparatus, a distributed processing method, and a computer-readable recording medium that solve the above problems, and whereby, in a distributed processing platform, a plurality of machine learning libraries can be used while reducing an increased burden on a user.

Means for Solving the Problems

In order to achieve the example object described above, a distributed processing management apparatus according to an example aspect of the invention is connected to a plurality of execution servers configured to execute distributed processing so as to be able to communicate with the execution servers, the distributed processing management apparatus including:

a conversion instruction unit configured to specify, for each of the plurality of execution servers, a data format usable by a machine learning engine executed by the execution server, and issue an instruction to convert a data format of data held by the execution server to the specified data format.

In order to achieve the example object described above, a distributed processing method according to an example aspect of the invention is a method for performing distributed processing using a plurality of execution servers, the distributed processing method including:

(a) a step of specifying, for each of the plurality of execution servers, a data format usable by a machine learning engine executed by the execution server, and issuing an instruction to convert a data format of data held by the execution server to the specified data format.

Furthermore, in order to achieve the example object described above, a computer-readable recording medium according to an example aspect of the invention includes a program recorded thereon for performing distributed processing using a plurality of execution servers with a computer, the program including instructions that cause the computer to carry out:

(a) a step of specifying, for each of the plurality of execution servers, a data format usable by a machine learning engine executed by the execution server, and issuing an instruction to convert a data format of data held by the execution server to the specified data format.

Advantageous Effects of the Invention

As described above, according to the invention, in a distributed processing platform, a plurality of machine learning libraries can be used while reducing an increased burden on a user.

BRIEF DESCRIPTION OF THE DRAWINGS

FIG. 4 shows instruction data when the distributed processing management apparatus according to an example embodiment of the invention designates a machine learning engine.

FIG. 5 shows instruction data when the distributed processing management apparatus according to an example embodiment of the invention instructs conversion to a common format.

FIG. 6 shows instruction data when the distributed processing management apparatus according to an example embodiment of the invention instructs conversion to a format compatible with the machine learning engine.

FIG. 8 shows an example of data held by each execution server in Example 1 of an example embodiment of the invention.

FIG. 9 shows an example of a common format used in Example 1 of an example embodiment of the invention.

FIG. 10 shows an example in which the data format of data held by each execution server shown in FIG. 8 is converted to a common format.

FIG. 11 shows an example of a data format used by a machine learning engine in Example 1 of an example embodiment of the invention.

FIG. 12 shows a state in which data in the common format shown in FIG. 9 has been converted to the data format shown in FIG. 11.

FIG. 13 shows an example of a data format used by a machine learning engine in Example 2 of an example embodiment of the invention.

FIG. 14 shows a state in which data in the common format shown in FIG. 9 has been converted to the data format shown in FIG. 13.

EXAMPLE EMBODIMENT (Summary of Invention)

Figure 1:
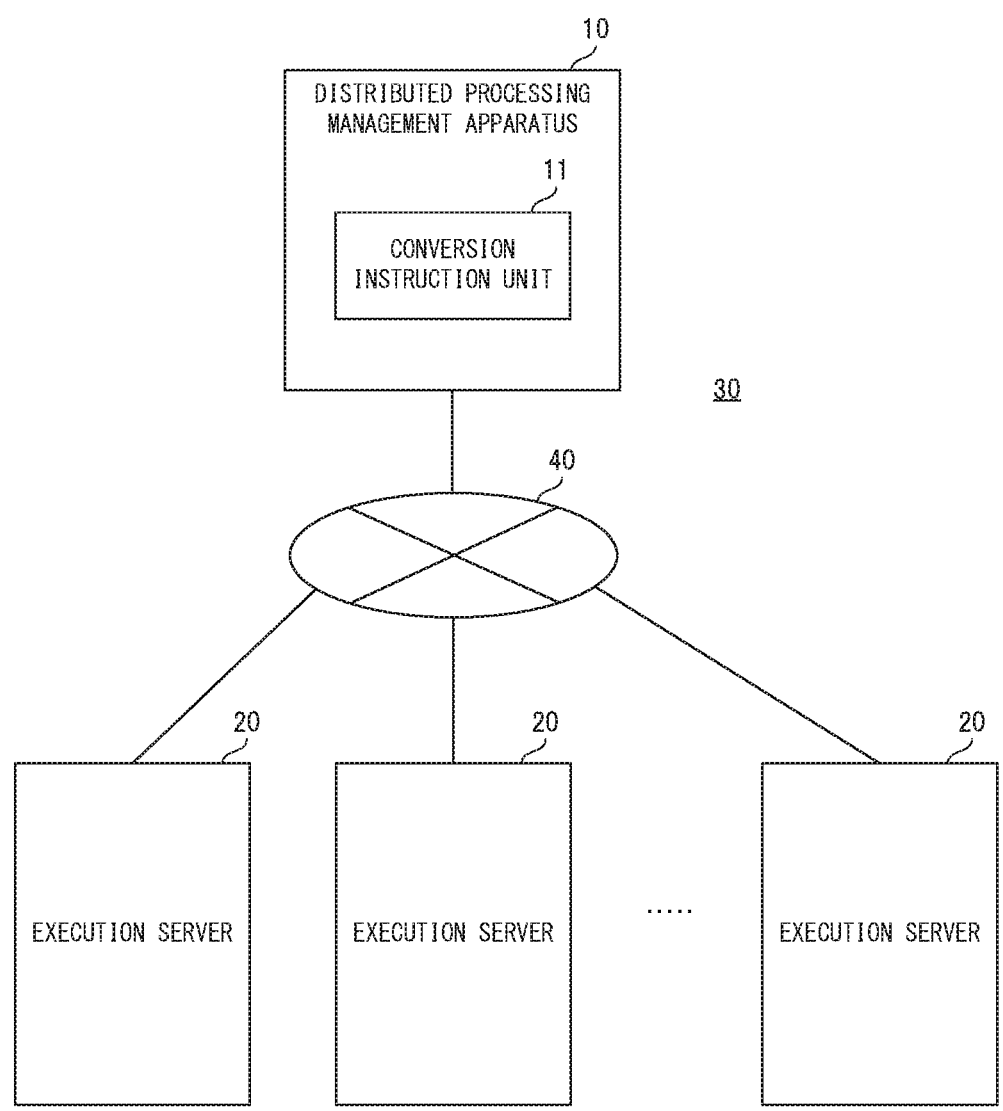
FIG. 1 is a block diagram showing a schematic configuration of a distributed processing management apparatus according to an example embodiment of the invention.

Conventionally, a concept of "executing a first machine learning engine that handles a first data format and a second machine learning engine that handles a second data format different from the first data format based on the same distributed processing platform" does not exist and is not disclosed in any previous document. This is because a plurality of different machine learning engines use different data formats in the first place. For example, a certain machine learning engine needs to read data in LibSVM format, while another machine learning engine needs to read data in CSV format. For this reason, conventionally, a plurality of machine learning engines having different data formats are not executed on one distributed processing platform.

On the other hand, in the present invention, a function is provided whereby a machine learning engine to be used is specified on a distributed processing platform, and data held in the distributed processing platform is converted to a data format usable by the specified machine learning engine. According to the present invention, it is possible to execute a plurality of machine learning engines having different data formats on one distributed processing platform. In particular, when a first machine learning engine and a second machine learning engine belong to different machine learning libraries, according to the present invention, a plurality of machine learning libraries can be executed on one distributed processing platform.

(Explanation of Terminology)

In order to facilitate understanding, terminology used below will now be described.

"Machine learning library": A machine learning library is a set of a plurality of programs (object code) required for machine learning. Each program is componentized so that the program can be used by calling the program from another program. Specific examples of a machine learning library include, for example, scikit-learn or TensorFlow, and the like.

"Machine learning engine": Of the plurality of programs included in the machine learning library, a program that executes machine learning is called a machine learning engine. For example, specific examples of the machine learning engine included in scikit-learn include LinearSVC and RandomForestClassifier. LinearSVC is a machine learning engine that executes a Support Vector Classification algorithm using a linear kernel. RandomForestClassifier is a machine learning engine that executes a Random Forest algorithm, which is a group learning algorithm using a decision tree as a weak learner. The Random Forest algorithm is a group learning algorithm using a decision tree as a weak learner. For example, specific examples of the machine learning engine included in TensorFlow include LSTM (Long Short-Term Memory) and CNN (Convolution Neural Network). LSTM is a machine learning engine that executes an algorithm to learn a long short-term memory model, which is a type of recurrent neural network model. CNN is a machine learning engine that executes an algorithm to learn a convolution neural network model.

"Data format": Specific examples of data formats include RDD format, LibSVM format, and CSV format. In addition, regarding training data for supervised machine learning, what column in which an objective variable (label) is to be arranged, differences in delimiters, and the like can be given as differences in the data format. Typically, the data format read by a plurality of machine learning engines included in one machine learning library often is common between machine learning engines. For example, a plurality of machine learning engines included in scikit-learn can read data in LibSVM format in common. A plurality of machine learning engines included in TensorFlow can read data in CSV (comma-separated value) format in common. On the other hand, even among machine learning engines belonging to the same machine learning library, a typical difference in data structure is, for example, a difference between a dense matrix expression that records all matrix elements including also an element with a numerical value of 0, and a sparse matrix expression that records position information of element rows and columns and element values as a set.

Typically, machine learning engines belonging to different machine learning libraries often handle different data formats.

Example Embodiment

Following is a description of a distributed processing management apparatus, a distributed processing method, and a computer-readable recording medium according to an example embodiment of the invention, with reference to FIGS. 1 to 15.

[Apparatus Configuration]

First, the schematic configuration of a distributed processing management apparatus according to this example embodiment will be described. FIG. 1 is a block diagram showing a schematic configuration of a distributed processing management apparatus according to an example embodiment of the invention.

As shown in FIG. 1, a distributed processing management apparatus 10 according to this example embodiment is connected through a network 40 to a plurality of execution servers 20 that execute distributed processing, so as to be able to communicate with the execution servers 20. The distributed processing management apparatus 10 together with the execution servers 20 forms a distributed processing platform 30.

Also, as shown in FIG. 1, the distributed processing management apparatus 10 according to this example embodiment is provided with a conversion instruction unit 11. The conversion instruction unit 11 is configured to first specify, for each execution server 20, a data format usable by a machine learning engine executed by the execution server 20. Then, the conversion instruction unit 11 issues to each execution server 20 an instruction to convert a data format of data held by that execution server to the specified data format.

Thus, in this example embodiment, the distributed processing management apparatus 10 specifies a data format usable by the machine learning engine executed by each execution server 20 and, for each execution server 20, converts the data format to a data format compatible with the learning engine.

Therefore, in this example embodiment, the data format handled in one distributed processing platform is not limited to one type, as in the case of a conventional distributed processing platform. In other words, in this example embodiment, a single distributed processing platform can handle a plurality of data formats. Typically, in this example embodiment, a plurality of machine learning libraries can be used in one distributed processing platform. Further, since data is converted to a data format suitable for each machine learning engine by the distributed processing management apparatus 10, the user can use a plurality of machine learning libraries without performing complicated task definition, and therefore the burden of task definition on the user can be reduced.

Figure 2:
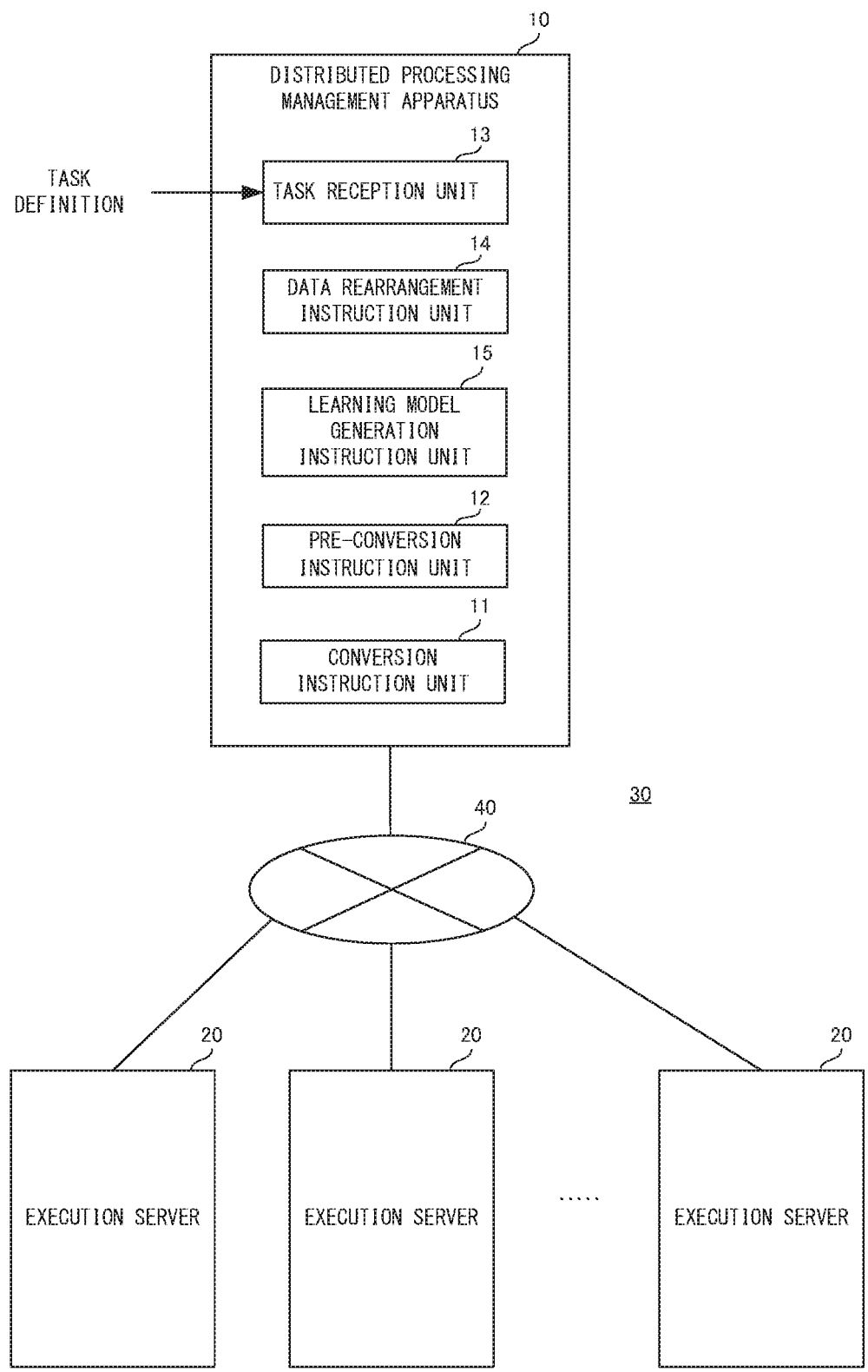
FIG. 2 is a block diagram showing a specific configuration of the distributed processing management apparatus according to an example embodiment of the invention.

Next, the configuration of the distributed processing management apparatus 10 according to this example embodiment will be described more specifically with reference to FIG. 2. FIG. 2 is a block diagram showing a specific configuration of the distributed processing management apparatus according to an example embodiment of the invention.

As shown in FIG. 2, in this example embodiment, in addition to the conversion instruction unit 11, the distributed processing management apparatus 10 further includes a pre-conversion instruction unit 12, a task reception unit 13, a data rearrangement instruction unit 14, and a learning model generation instruction unit 15.

The pre-conversion instruction unit 12 is configured to issue an instruction to each execution server 20 to convert the data format of data held by the execution server 20 to a predetermined common format. The common format includes, for example, a data format usable by a machine learning engine used in each execution server 20 and including only feature amounts and labels (see FIG. 6 described later).

In this example embodiment, the conversion instruction unit 11 is configured to, when specifying a data format usable by the machine learning engine executed in each execution server 20, issue an instruction to each execution server 20 to convert the data format of data that has been converted to the common format to the specified data format (for example such as LibSVM format or CSV format).

The task reception unit 13 is configured to receive a task definition of the distributed processing executed by each of the execution servers 20.

The data rearrangement instruction unit 14 is configured to, when each of the execution servers 20 holds data to be used for distributed processing in advance, based on the task definition received by the task reception unit 13, determine data to be held by each of the execution servers 20.

The data rearrangement instruction unit 14 is configured to instruct each of the plurality of execution servers 20 to perform data rearrangement so as to hold data according to the determination. In this case, the pre-conversion instruction unit 12 causes each of the plurality of execution servers 20 to convert the data format of data after rearrangement to the common format.

The learning model generation instruction unit 15 is configured to, for each of the plurality of execution servers 20, designate a machine learning engine to be executed by the execution server 20, and issue an instruction to generate a learning model using the designated machine learning engine. Also, in this case, the conversion instruction unit 11 issues, to each of the plurality of execution servers, an instruction to convert the data format of data held by the execution server 20 to a data format usable by the designated machine learning engine 15.

Further, in this example embodiment, a mode may be adopted in which the plurality of execution servers 20 include an execution server group that executes a first machine learning engine that can use a first data format, and an execution server group that executes a second machine learning engine that can use a second data format different from the first data format. In this case, the first machine learning engine and the second machine learning engine belong to different machine learning libraries.

[Apparatus Operation]

Next, operation of the distributed processing management apparatus 10 and each execution server 20 according to this example embodiment of the invention will be described with reference to FIGS. 3 and 4. The following description refers to FIGS. 1 and 2 as appropriate. Also, in this example embodiment, a distributed processing method is implemented by operating the distributed processing management apparatus 10. Thus, the description of the distributed processing method in this example embodiment can be replaced with the description of operation of the distributed processing management apparatus 10 below.

First, operation of the distributed processing management apparatus 10 will be described with reference to FIGS. 3 to 6. FIG. 3 is a flowchart showing operation of the distributed processing management apparatus according to this example embodiment of the invention. FIG. 4 shows instruction data when the distributed processing management apparatus according to this example embodiment of the invention designates a machine learning engine. FIG. 5 shows instruction data when the distributed processing management apparatus according to this example embodiment of the invention instructs conversion to a common format. FIG. 6 shows instruction data when the distributed processing management apparatus according to this example embodiment of the invention instructs conversion to a format compatible with the machine learning engine.

Figure 3:
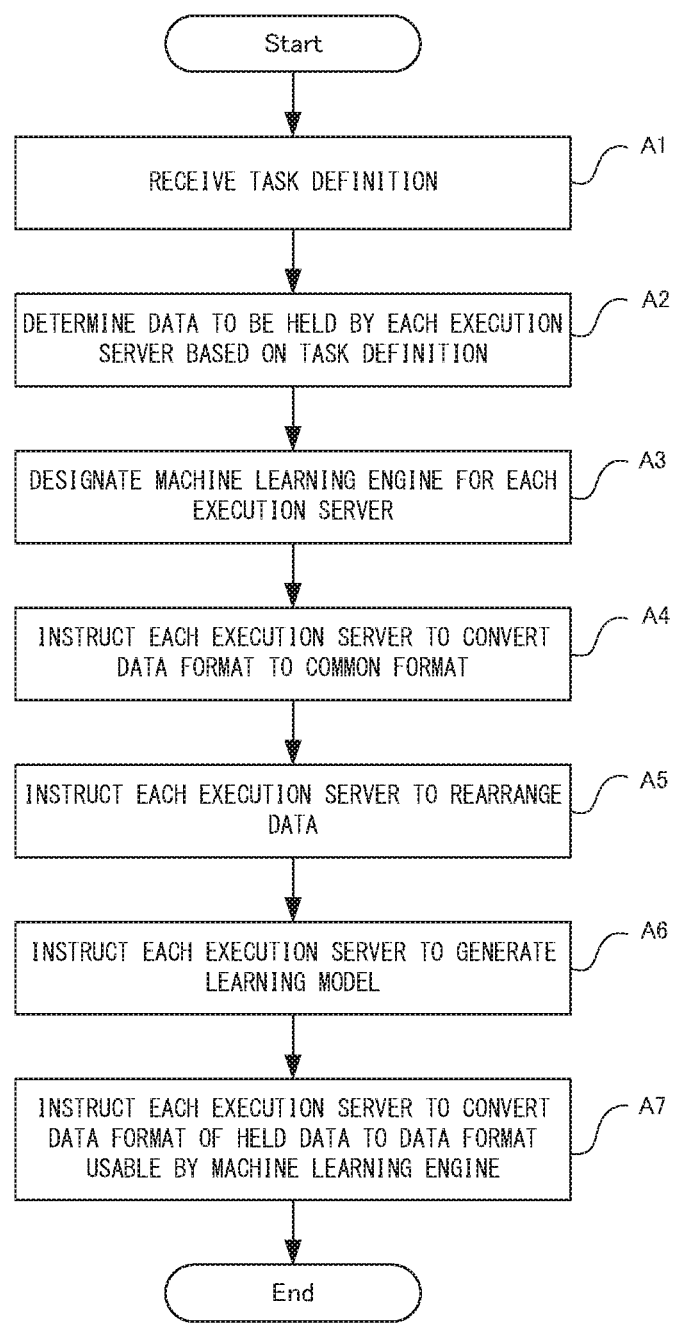
FIG. 3 is a flowchart showing operation of the distributed processing management apparatus according to an example embodiment of the invention.

As shown in FIG. 3, first, in the distributed processing management apparatus 10, the task reception unit 13 receives the task definition of the distributed processing executed by each execution server 20 (step A1). The task definition is input, for example, by an administrator of the distributed processing platform 30 through an external terminal device.

Next, when each of the execution servers 20 holds data to be used for distributed processing in advance, the data rearrangement instruction unit 14, based on the task definition received in step A1, determines data to be held by each of the execution servers 20 (step A2).

Next, when step A2 is executed, the learning model generation instruction unit 15, for each execution server 20, designates a machine learning engine to be executed by that execution server 20 (step A3). Specifically, the learning model generation instruction unit 15, for example, transmits the instruction data shown in FIG. 4 to each execution server 20.

Next, the pre-conversion instruction unit 12 issues an instruction to each execution server 20 to convert the data format of held data to the common format (step A4). Specifically, the pre-conversion instruction unit 12 transmits, for example, the instruction data shown in FIG. 5 to each execution server 20. As a result, steps B1 and B2 shown in FIG. 7 described later are executed, and each execution server 20 converts the data format of the held data to the common format.

Next, the data rearrangement instruction unit 14 instructs each of the plurality of execution servers 20 to perform data rearrangement so as to hold data according to the determination in step A2 (step A5). When step A5 is executed, each execution server 20 executes steps B3 and B4 shown in FIG. 7 described later. The data that has been converted to the common format is thus in a state appropriately arranged in each execution server.

Next, the learning model generation instruction unit 15 issues an instruction to each execution server 20 to generate a learning model using the machine learning engine designated in step A3 (step A6). Specifically, the learning model generation instruction unit 15 instructs each execution server 20 to designate a machine learning library used in the execution server 20 and generate a learning model. As a result, in each execution server 20, step B5 shown in FIG. 7 described below is executed.

The "machine learning library" is a file that includes a machine learning engine and various tools necessary for machine learning, and is provided for each instance of machine learning. In this example embodiment, the machine learning library may be prepared by the distributed processing management apparatus 10, or may be prepared in an external device.

Further, when step A6 is executed, the conversion instruction unit 11 instructs each execution server 20 to convert the data format of the data held by the execution server 20 to a data format usable by the designated machine learning engine (step A7). Specifically, the conversion instruction unit 11 transmits, for example, the instruction data shown in FIG. 7 to each execution server 20. As a result, in each execution server 20, steps B6 to B8 shown in FIG. 7 described later are executed.

Figure 7:
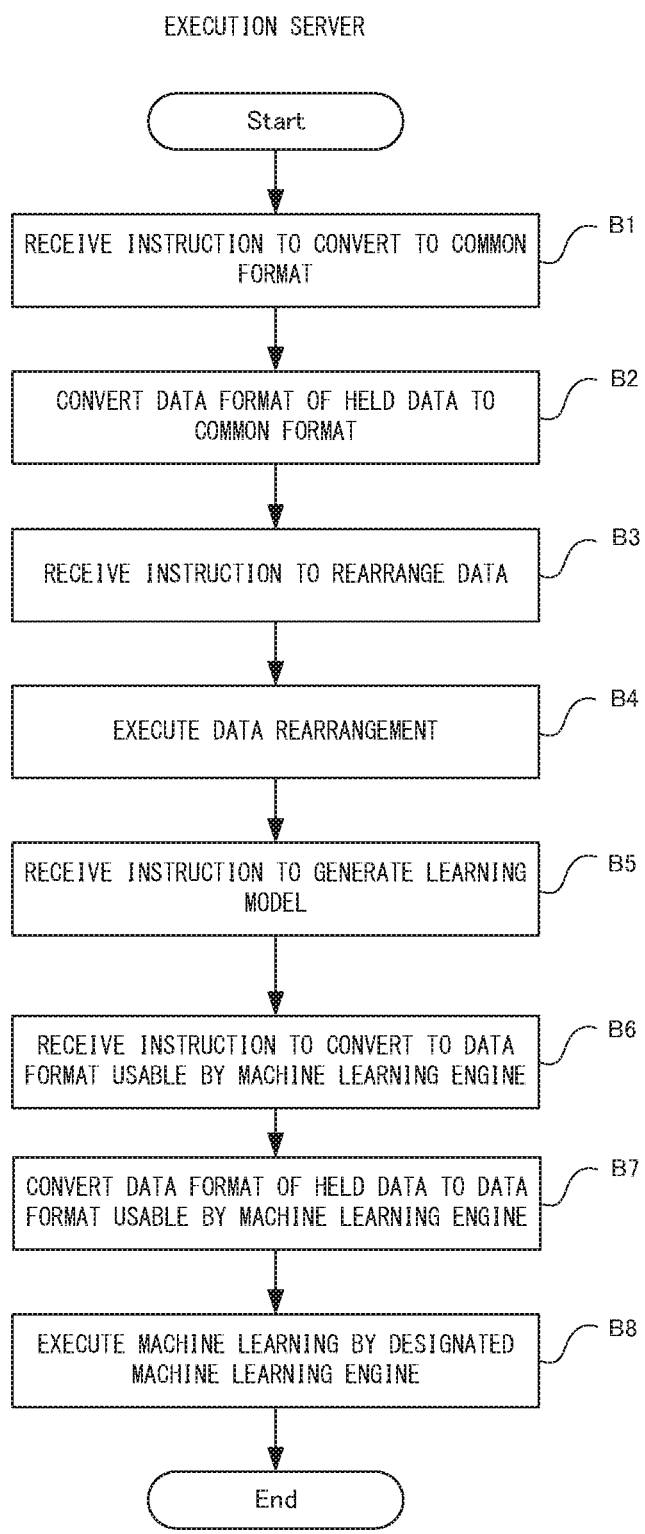
FIG. 7 is a flowchart showing one operation of an execution server used in an example embodiment of the invention.

Next, operation of an execution server 20 will be described with reference to FIG. 7. FIG. 7 is a flowchart showing one operation of an execution server used in an example embodiment of the invention. Below, operation will be described using one of a plurality of execution servers as an example.

As shown in FIG. 7, when the distributed processing management apparatus 10 executes steps A1 to A4 shown in FIG. 3 and instructs conversion to the common format, the execution server 20 receives this conversion instruction (step B1), and converts the data format of the held data into a common format (step B2).

Next, when the distributed processing management apparatus 10 executes step A5 shown in FIG. 3 and instructs data rearrangement, the execution server 20 receives the data rearrangement instruction (step B3), and data rearrangement is executed so as to correspond to the received instruction (step B4). Specifically, in step B4, the execution server 20 transmits the data instructed to be transmitted to another execution server 20 to that execution server, and receives the data transmitted from the other execution server 20, and holds the received data.

Next, when the distributed processing management apparatus 10 executes step A6 shown in FIG. 3, and instructs generation of a learning model using the designated machine learning engine, the execution server 20 receives the instruction to generate a learning model (step B5). Next, step A6 is executed by the distributed processing management apparatus 10, and when an instruction is issued to convert the data format of the held data into a data format usable by the designated machine learning engine, the execution server 20 also receives this instruction (step B6).

Next, the execution server 20 converts the data format of the held data to the data format instructed in step B6 (step B7), and uses the converted data to execute machine learning by the designated machine learning engine (step B8).

As described above, in this example embodiment, in the distributed processing platform 30, it is possible to execute machine learning using a different machine learning engine for each execution server. According to this example embodiment, a plurality of machine learning libraries can be used in the distributed processing platform 30.

Further, in this example embodiment, since the data format of the data held by each execution server 20 is once converted to the common format, each execution server 20 can easily convert the data format to a format compatible with the machine learning engines to be used.

If the data format has not been converted to the common format, it is necessary for each execution server 20 to specify the current data format, search for a conversion module capable of converting the specified data format to a format compatible with the machine learning engine to be used, and afterward perform conversion. In this case, the processing load on the execution server is large, and the learning process is delayed.

Incidentally, in a conventional distributed processing platform, when adding a new machine learning engine, it is necessary to prepare a conversion module that converts a data format suitable for that distributed processing platform to a data format read by the new machine learning engine, and this is complicated for the user. On the other hand, in this example embodiment as well, in the distributed processing platform 30, when adding a new machine learning engine, it is necessary to prepare a conversion module dedicated to that engine as a conversion module for converting the data format to the common format.

However, the conversion module used in this example embodiment, which converts the common format to a data format read by the new machine learning engine, is different from a conversion module that converts a data format suitable for the distributed processing platform to a data format read by the new machine learning engine. When using a conversion module that converts from the common format to a data format read by the new machine learning engine, the man-hour load of implementation can be reduced. Furthermore, as a result, the amount of execution code of the program when adding the new machine learning engine is reduced, so the risk of introducing a defect such as a bug can also be reduced.

In other words, rather than preparing a conversion module that converts a data format suitable for the distributed processing platform to a data format read by the new machine learning engine, it is easier to prepare a conversion module that converts the data format from the common format to a data format read by the new machine learning engine.

The reason for this is described next. FIG. 6 shows an example of conversion from a common format to a data format read by a machine learning engine. In the example of FIG. 6, two functions are shown. One is a learnWithLibLinear ( ) function (lines 12 to 24) that converts the common format to a data format read by a machine learning engine called LibLinear and executes the machine learning engine. Another is a learnWithScikitLearn ( ) function (lines 26 to 34) that converts the common format to a data format read by a machine learning engine called scikit-learn and executes the machine learning engine.

The point to be noted in the example of FIG. 6 is that, except for the line of the instruction for executing the machine learning engine, the difference between the two function conversion processes is only the one line of the 14th line and the 28th line respectively. That is, the implementer of the conversion module can implement the conversion module by only changing a few lines that change the data format by the machine learning engine. The reason that it is easy to prepare a conversion module that converts the data format from the common format to a data format read by the new machine learning engine is described above.

Example 1

Next an Example 1 of this example embodiment will be described with reference to FIGS. 8 to 12. FIG. 8 shows an example of data held by each execution server in Example 1 of an example embodiment of the invention. FIG. 9 shows an example of a common format used in Example 1 of an example embodiment of the invention. FIG. 10 shows an example in which the data format of data held by each execution server shown in FIG. 8 is converted to a common format. FIG. 11 shows an example of a data format used by a machine learning engine in Example 1 of an example embodiment of the invention. FIG. 12 shows a state in which data in the common format shown in FIG. 9 has been converted to the data format shown in FIG. 11.

In the following description, it is assumed that there are two execution servers 20, respectively described as an execution server A and an execution server B. As shown in FIG. 8, it is assumed that the execution servers A and B respectively use different machine learning engines and have different usable data formats. Further, it is assumed that the execution servers A and B respectively hold data in different data formats.

Also, in Example 1, as shown in FIG. 9, the common format is a data format usable by the machine learning engine used in the execution servers A and B, including feature amounts (feature amounts 1 to 3, and prediction target variables), and labels (sample IDs). In this case, a feature amount is used as a candidate for an explanatory variable in machine learning.

In Example 1, when the pre-conversion instruction unit 12 issues an instruction to each of the execution servers A and B to convert the data format of the held data to the common format, the execution servers A and B convert the data format to the common format, as shown in FIG. 10.

Also, it is assumed that the machine learning engines used in Example 1 are the two machine learning engines A and B, and the data format required by each machine learning engine is as shown in FIG. 11. In this case, the conversion instruction unit 11 instructs the execution server A to convert the data format to the data format of the machine learning engine A. Further, the conversion instruction unit 11 instructs the execution server B to convert the data format to the data format of the machine learning engine B.

As a result, the data format of the data held by the respective execution servers A and B shown in FIG. 10 is converted as shown in FIG. 12. Specifically, the execution server A removes the column of the sample ID in the common format, and also removes the column name of the remaining column. Further, the execution server B moves the column of the prediction target variable in the common format to the second column from the left, and further removes each column name. Note that in FIG. 12, column names are also written in parentheses for description.

Thus, after the data format of the data held by each execution server 20 is once converted to the common format, each execution server 20 can easily convert the data format to a format compatible with the machine learning engine to be used.

In addition, in this example embodiment, a one-dimensional array may be adopted as a common format. For example, the common format may be a format obtained by converting the common format shown in FIG. 9 to a one-dimensional array in the row direction. In this case, the data shown in FIG. 9 is as follows. Also, below, the first element indicates the number of rows in the original table, and the second element indicates the number of columns in the original table.

(2,5, 1.0, 1.8, 3.0, 2.5, 1.0, 2.0, 3.4, 1.0, −2.9, −1.0)

Also, it is assumed that the machine learning engine requests a data format in which a one-dimensional array in the column direction is adopted as the data format. In this case, the data of the one-dimensional array in the row direction is converted as follows.

(2,5, 1.0, 2.0, 1.8, 3.4, 3.0, 1.0, 2.5, −2.9, 1.0, −1.0)

Example 2

Next an Example 2 of this example embodiment will be described with reference to FIGS. 13 and 14. FIG. 13 shows an example of a data format used by a machine learning engine in Example 2 of an example embodiment of the invention. FIG. 14 shows a state in which data in the common format shown in FIG. 9 has been converted to the data format shown in FIG. 13.

In Example 2 as well, the data held by the execution servers A and B is the same as in Example 1, and the common format is also the same as in Example 1. Also, in Example 2, as shown in FIG. 13, the data format required by the machine learning engine A is the same as that of Example 1, and is represented by a dense matrix expression. However, the data format required by the machine learning engine B is different from that in Example 1, and is represented by a sparse matrix expression. The sparse matrix expression is a linked list expression in which element positions and values are arranged.

Therefore, in Example 2, when the conversion instruction unit 11 instructs the execution server A to convert the data format, the execution server A removes the column of the sample ID in the common format, as in Example 1, and also removes the column names of the remaining columns are also removed. On the other hand, when the conversion instruction unit 11 instructs the execution server B to convert the data format, the execution server B changes the dense matrix expression to the sparse matrix expression and removes the column names.

As a result, in Example 2, the data format of the data held by the respective execution servers A and B shown in FIG. 10 is converted as shown in FIG. 14. In Example 2, as in Example 1, the data format of the data held by each execution server 20 is once converted to the common format, so each execution server 20 can easily convert the data format to a format compatible with the machine learning engines to be used.

MODIFIED EXAMPLE

When performing machine learning on a program (for example, a Java (registered trademark) program) executed on the distributed processing platform 30, it is necessary to execute a process different from the operating system. Therefore, in the execution server 20, it is necessary to separately provide a memory space used by the program and a memory space of the learning engine, and copy data between these memory spaces.

Therefore, in this modified example, for example, a machine learning engine can be executed on Java by using a JNI (Java Native Interface). In this case, machine learning can be performed on Java without separately providing a memory space.

[Program]

A program according to this example embodiment of the invention may be a program that causes a computer to execute steps A1 to A7 shown in FIG. 3. By installing this program in the computer and executing the program, the distributed processing management apparatus 10 and the distributed processing method according to this example embodiment can be realized. In this case, a processor of the computer performs processing to function as the conversion instruction unit 11, the pre-conversion instruction unit 12, the task reception unit 13, the data rearrangement instruction unit 14, and the learning model generation instruction unit 15.

Also, the program according to this example embodiment may be executed by a computer system constructed using a plurality of computers. In this case, for example, each computer may respectively function as any of the conversion instruction unit 11, the pre-conversion instruction unit 12, the task reception unit 13, the data rearrangement instruction unit 14, and the learning model generation instruction unit 15.

[Physical Configuration]

Figure 15:
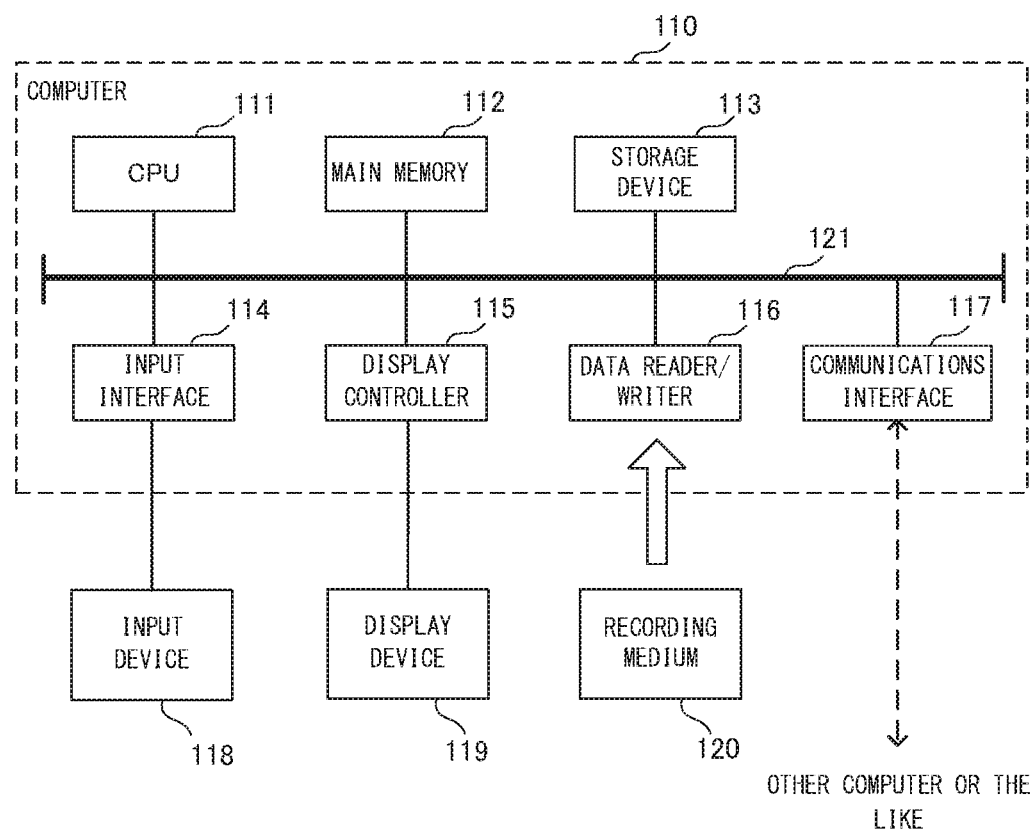
FIG. 15 is a block diagram showing an example of a computer that realizes the distributed processing management apparatus according to an example embodiment of the invention.

Here, a computer that realizes a distributed processing management apparatus by executing the program according to this example embodiment will be described with reference to FIG. 15. FIG. 15 is a block diagram showing an example of a computer that realizes the distributed processing management apparatus according to an example embodiment of the invention.

As shown in FIG. 15, the computer 110 includes a CPU (Central Processing Unit) 111, a main memory 112, a storage device 113, an input interface 114, a display controller 115, a data reader/writer 116, and a communications interface 117. These units are each connected so as to be capable of performing data communications with each other through a bus 121.

The CPU 111 opens the program (code) according to this example embodiment, which has been stored in the storage device 113, in the main memory 112 and performs various operations by executing the program in a predetermined order. The main memory 112 is typically a volatile storage device such as a DRAM (Dynamic Random Access Memory). Also, the program according to this example embodiment is provided in a state stored in a computer-readable recording medium 120. Note that the program according to this example embodiment may be distributed on the Internet, which is connected through the communications interface 117.

Also, other than a hard disk drive, a semiconductor storage device such as a flash memory can be given as a specific example of the storage device 113. The input interface 114 mediates data transmission between the CPU 111 and an input device 118, which may be a keyboard or mouse. The display controller 115 is connected to a display device 119, and controls display on the display device 119.

The data reader/writer 116 mediates data transmission between the CPU 111 and the recording medium 120, and executes reading of a program from the recording medium 120 and writing of processing results in the computer 110 to the recording medium 120. The communications interface 117 mediates data transmission between the CPU 111 and other computers.

Also, general-purpose semiconductor storage devices such as CF (Compact Flash (registered trademark)) and SD (Secure Digital), a magnetic recording medium such as a Flexible Disk, or an optical recording medium such as a CD-ROM (Compact Disk Read-Only Memory) can be given as specific examples of the recording medium 120.

Also, instead of a computer in which a program is installed, the distributed processing management apparatus 10 according to this example embodiment can also be realized by using hardware corresponding to each unit. Furthermore, a portion of the distributed processing management apparatus 10 may be realized by a program, and the remaining portion realized by hardware.

Some portion or all of the example embodiments described above can be realized according to (supplementary note 1) to (supplementary note 24) described below, but the below description does not limit the invention.

(Supplementary Note 1)

A distributed processing management apparatus connected to a plurality of execution servers configured to execute distributed processing so as to be able to communicate with the execution servers, the distributed processing management apparatus including:

a conversion instruction unit configured to specify, for each of the plurality of execution servers, a data format usable by a machine learning engine executed by the execution server, and issue an instruction to convert a data format of data held by the execution server to the specified data format.

(Supplementary Note 2)

The distributed processing management apparatus according to supplementary note 1, wherein the plurality of execution servers include an execution server group that executes a first machine learning engine that can use a first data format, and an execution server group that executes a second machine learning engine that can use a second data format different from the first data format, the first machine learning engine and the second machine learning engine belonging to different machine learning libraries.

(Supplementary Note 3)

The distributed processing management apparatus according to supplementary note 1 or 2, further including:

a pre-conversion instruction unit configured to issue, to each of the plurality of execution servers, an instruction to convert a data format of data held by the execution server to a predetermined common format, wherein the conversion instruction unit is configured to issue, to each of the plurality of execution servers, an instruction to convert the data format of data that has been converted to the common format to the specified data format.

(Supplementary Note 4)

The distributed processing management apparatus according to supplementary note 3, wherein the common format is a data format usable by a machine learning engine used in each of the plurality of execution servers and includes only feature amounts and labels.

(Supplementary Note 5)

The distributed processing management apparatus according to supplementary note 3 or 4, further including:

a task reception unit configured to receive a task definition of distributed processing executed by the plurality of execution servers.

(Supplementary Note 6)

The distributed processing management apparatus according to supplementary note 5, further including:

a data rearrangement instruction unit configured to, when each of the plurality of execution servers holds data to be used for the distributed processing in advance, based on the task definition received by the task reception unit, determine data to be held by each of the plurality of execution servers, and instruct each of the plurality of execution servers to perform data rearrangement so as to hold data according to the determination, wherein the pre-conversion instruction unit causes each of the plurality of execution servers to convert the data format of data after rearrangement to the common format.

(Supplementary Note 7)

The distributed processing management apparatus according to any of supplementary notes 1 to 6, further including:

a learning model generation instruction unit configured to, for each of the plurality of execution servers, designate a machine learning engine to be executed by the execution server, and issue an instruction to generate a learning model using the designated machine learning engine, wherein the conversion instruction unit is configured to issue, to each of the plurality of execution servers, an instruction to convert the data format of data held by the execution server to a data format usable by the designated machine learning engine.

(Supplementary Note 8)

The distributed processing management apparatus according to any of supplementary notes 1 to 7, wherein in each of the plurality of execution servers, the machine learning engine used is different, and furthermore, the usable data format is different for each machine learning engine.

(Supplementary Note 9)

A distributed processing method for performing distributed processing using a plurality of execution servers, the distributed processing method including:

(a) a step of specifying, for each of the plurality of execution servers, a data format usable by a machine learning engine executed by the execution server, and issuing an instruction to convert a data format of data held by the execution server to the specified data format.

(Supplementary Note 10)

The distributed processing method according to supplementary note 9, wherein the plurality of execution servers include an execution server group that executes a first machine learning engine that can use a first data format, and an execution server group that executes a second machine learning engine that can use a second data format different from the first data format, the first machine learning engine and the second machine learning engine belonging to different machine learning libraries.

(Supplementary Note 11)

The distributed processing method according to supplementary note 9 or 10, further including:

(b) a step of issuing, to each of the plurality of execution servers, an instruction to convert a data format of data held by the execution server to a predetermined common format, wherein in the (a) step, to each of the plurality of execution servers, an instruction is issued to convert the data format of data that has been converted to the common format to the specified data format.

(Supplementary Note 12)

The distributed processing method according to supplementary note 9, wherein the common format is a data format usable by a machine learning engine used in each of the plurality of execution servers and includes only feature amounts and labels.

(Supplementary Note 13)

The distributed processing method according to supplementary note 11 or 12, further including:

(c) a step of receiving a task definition of distributed processing executed by the plurality of execution servers.

(Supplementary Note 14)

The distributed processing method according to supplementary note 13, further including:

(d) a step of, when each of the plurality of execution servers holds data to be used for the distributed processing in advance, based on the task definition received in the (c) step, determining data to be held by each of the plurality of execution servers, and instructing each of the plurality of execution servers to perform data rearrangement so as to hold data according to the determination, wherein in the (b) step, each of the plurality of execution servers is caused to convert the data format of data after rearrangement to the common format.
(Supplementary Note 15)

The distributed processing method according to any of supplementary notes 9 to 14, further including:

(e) a step of, for each of the plurality of execution servers, designating a machine learning engine to be executed by the execution server, and issuing an instruction to generate a learning model using the designated machine learning engine, wherein in the (a) step, to each of the plurality of execution servers, an instruction is issued to convert the data format of data held by the execution server to a data format usable by the designated machine learning engine.
(Supplementary Note 16)

The distributed processing method according to any of supplementary notes 9 to 15, further including:

wherein in each of the plurality of execution servers, the machine learning engine used is different, and furthermore, the usable data format is different for each machine learning engine.
(Supplementary Note 17)

A computer-readable recording medium that includes a program recorded thereon for performing distributed processing using a plurality of execution servers with a computer, the program including instructions that cause the computer to carry out:

(a) a step of specifying, for each of the plurality of execution servers, a data format usable by a machine learning engine executed by the execution server, and issuing an instruction to convert a data format of data held by the execution server to the specified data format.
(Supplementary Note 18)

The computer-readable recording medium according to supplementary note 17, wherein the plurality of execution servers include an execution server group that executes a first machine learning engine that can use a first data format, and an execution server group that executes a second machine learning engine that can use a second data format different from the first data format, the first machine learning engine and the second machine learning engine belonging to different machine learning libraries.
(Supplementary Note 19)

The computer-readable recording medium according to supplementary note 17 or 18, further including:

(b) a step of issuing, to each of the plurality of execution servers, an instruction to convert a data format of data held by the execution server to a predetermined common format, wherein in the (a) step, to each of the plurality of execution servers, an instruction is issued to convert the data format of data that has been converted to the common format to the specified data format.
(Supplementary Note 20)

The computer-readable recording medium according to supplementary note 19, wherein the common format is a data format usable by a machine learning engine used in each of the plurality of execution servers and includes only feature amounts and labels.
(Supplementary Note 21)

The computer-readable recording medium according to supplementary note 19 or 20, the program further including instructions that cause the computer to carry out:

(c) a step of receiving a task definition of distributed processing executed by the plurality of execution servers.
(Supplementary Note 22)

The computer-readable recording medium according to supplementary note 21, the program further including instructions that cause the computer to carry out:

(d) a step of, when each of the plurality of execution servers holds data to be used for the distributed processing in advance, based on the task definition received in the (c) step, determining data to be held by each of the plurality of execution servers, and instructing each of the plurality of execution servers to perform data rearrangement so as to hold data according to the determination, wherein in the (b) step, each of the plurality of execution servers is caused to convert the data format of data after rearrangement to the common format.
(Supplementary Note 23)

The computer-readable recording medium according to any of supplementary notes 17 to 22, the program further including instructions that cause the computer to carry out:

(e) a step of, for each of the plurality of execution servers, designating a machine learning engine to be executed by the execution server, and issuing an instruction to generate a learning model using the designated machine learning engine, wherein in the (a) step, to each of the plurality of execution servers, an instruction is issued to convert the data format of data held by the execution server to a data format usable by the designated machine learning engine.
(Supplementary Note 24)

The computer-readable recording medium according to any of supplementary notes 17 to 23, wherein in each of the plurality of execution servers, the machine learning engine used is different, and furthermore, the usable data format is different for each machine learning engine.

Although the invention of this application has been described with reference to exemplary embodiments, the invention of this application is not limited to the above exemplary embodiments. Within the scope of the invention of this application, various changes that can be understood by those skilled in the art can be made to the configuration and details of the invention of this application.

This application is based upon and claims the benefit of priority from U.S. application No. 62/577,408, filed on Oct. 26, 2017, the disclosure of which is incorporated herein in its entirety by reference.

INDUSTRIAL APPLICABILITY

As described above, according to the invention, in a distributed processing platform, a plurality of machine learning libraries can be used without increasing the burden on a user. The present invention is useful when performing machine learning on a large amount of data using a distributed system.

REFERENCE SIGNS LIST

10 Distributed processing management apparatus
11 Conversion instruction unit
12 Pre-conversion instruction unit
13 Task reception unit
14 Data rearrangement instruction unit
15 Learning model generation instruction unit
20 Execution server
30 Distributed processing platform 40 Network
110 Computer
111 CPU
112 Main memory
113 Storage device
114 Input interface
115 Display controller
116 Data reader/writer
117 Communications interface
118 Input device
119 Display device
120 Recording medium
121 Bus

The invention claimed is:

1. A distributed processing management apparatus connected to a plurality of execution servers configured to execute distributed processing so as to be able to communicate with the plurality of execution servers, the distributed processing management apparatus comprising:
one or more memories storing instructions; and
one or more processors configured to execute the instructions to function as:
a task reception unit configured to receive a task definition of distributed processing executed by the plurality of execution servers;
a data rearrangement instruction unit configured to, when each of the plurality of execution servers holds data to be used for the distributed processing in advance, based on the task definition received by the task reception unit, determine data to be held by each of the plurality of execution servers, and instruct each of the plurality of execution servers to perform data rearrangement so as to hold data according to the determination;
a pre-conversion instruction unit configured to issue, to each of the plurality of execution servers, and instruction to convert a data format of data held by the execution server to a predetermined common format; and
a conversion instruction unit configured to specify, for each of the plurality of execution servers, a data format usable by a machine learning engine executed by the execution server, and issue an instruction to convert a data format of data held by the execution server to the specified data format,
wherein the conversion instruction unit is configured to issue, to each of the plurality of execution servers, an instruction to convert the data format of data that has been converted to the common format to specified data format, and
wherein the pre-conversion instruction unit causes each of the plurality of execution servers to convert the data format of data after rearrangement to the common format.

2. The distributed processing management apparatus according to claim 1,
wherein the plurality of execution servers include an execution server group that executes a first machine learning engine that can use a first data format, and an execution server group that executes a second machine learning engine that can use a second data format different from the first data format,
the first machine learning engine and the second machine learning engine belonging to different machine learning libraries.

3. The distributed processing management apparatus according to claim 1,
wherein the common format is a data format usable by a machine learning engine used in each of the plurality of execution servers and includes only feature amounts and labels.

4. The distributed processing management apparatus according to claim 1, wherein the one or more processors are further configured to execute the instructions to function as:
a learning model generation instruction unit configured to, for each of the plurality of execution servers, designate a machine learning engine to be executed by the execution server, and issue an instruction to generate a learning model using the designated machine learning engine,
wherein the conversion instruction unit is configured to issue, to each of the plurality of execution servers, an instruction to convert the data format of data held by the execution server to a data format usable by the designated machine learning engine.

5. The distributed processing management apparatus according to claim 1,
wherein in each of the plurality of execution servers, the machine learning engine used is different, and furthermore, the usable data format is different for each machine learning engine.

6. A distributed processing method for performing distributed processing using a plurality of execution servers, the distributed processing method comprising:
receiving a task definition of distributed processing executed by the plurality of execution servers;
based on the task definition received, determining data to be held by each of the plurality of execution servers, and instruction each of the plurality of execution servers to perform data rearrangement so as to hold data according to the determination, wherein each of the plurality of execution servers holds data to be used for the distributed processing in advance;
issuing, to each of the plurality of execution servers, an instruction to convert a data format of data held by the execution servers to a predetermined common format;
controlling each of the plurality of execution servers to convert the data format of data after rearrangement to the common format; and
specifying, for each of the plurality of execution servers, a data format usable by a machine learning engine executed by the execution server, and issuing an instruction to convert a data format of the data that has been converted to the common format and is held by the execution server, to the specified data format.

7. The distributed processing method according to claim 6,
wherein the plurality of execution servers include an execution server group that executes a first machine learning engine that can use a first data format, and an execution server group that executes a second machine learning engine that can use a second data format different from the first data format,
the first machine learning engine and the second machine learning engine belonging to different machine learning libraries.

8. The distributed processing method according to claim 6,
wherein the common format is a data format usable by a machine learning engine used in each of the plurality of execution servers and includes only feature amounts and labels.

9. The distributed processing method according to claim 6, further comprising:

for each of the plurality of execution servers, designating a machine learning engine to be executed by the execution server, and issuing an instruction to generate a learning model using the designated machine learning engine, wherein in the specifying, to each of the plurality of execution servers, an instruction is issued to convert the data format of data held by the execution server to a data format usable by the designated machine learning engine.

10. The distributed processing method according to claim 6, further comprising:

wherein in each of the plurality of execution servers, the machine learning engine used is different, and furthermore, the usable data format is different for each machine learning engine.

11. A non-transitory computer-readable recording medium that includes a program recorded thereon for performing distributed processing using a plurality of execution servers with a computer, the program including instructions that cause the computer to carry out:

receiving a task definition of distributed processing executed by the plurality of execution servers;

based on the task definition received, determining data to be held by each of the plurality of execution servers, and instruction each of the plurality of execution servers to perform data rearrangement so as to hold data according to the determination, wherein each of the plurality of execution servers holds data to be used for the distributed processing in advance;

issuing, to each of the plurality of execution servers, an instruction to convert a data format of data held by the execution servers to a predetermined common format;

controlling each of the plurality of execution servers to convert the data format of data after rearrangement to the common format; and specifying, for each of the plurality of execution servers, a data format usable by a machine learning engine executed by the execution server, and issuing an instruction to convert a data format of the data that has been converted to the common format and is held by the execution server, to the specified data format.

12. The non-transitory computer-readable recording medium according to claim 11, wherein the plurality of execution servers include an execution server group that executes a first machine learning engine that can use a first data format, and an execution server group that executes a second machine learning engine that can use a second data format different from the first data format, the first machine learning engine and the second machine learning engine belonging to different machine learning libraries.

13. The non-transitory computer-readable recording medium according to claim 11, wherein the common format is a data format usable by a machine learning engine used in each of the plurality of execution servers and includes only feature amounts and labels.

\* \* \* \* \*